J. K. GUMPPER.
WHEEL ATTACHMENT.
APPLICATION FILED MAY 1, 1918.
1,306,004.
Patented June 10, 1919.
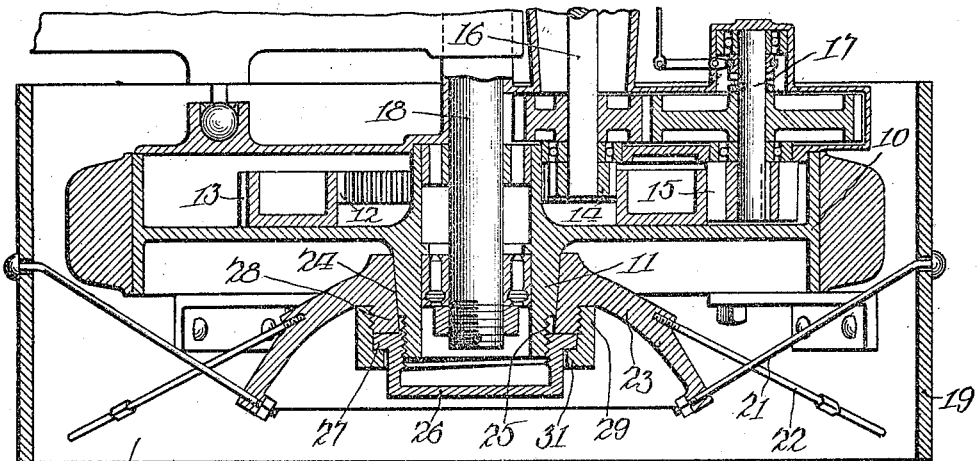
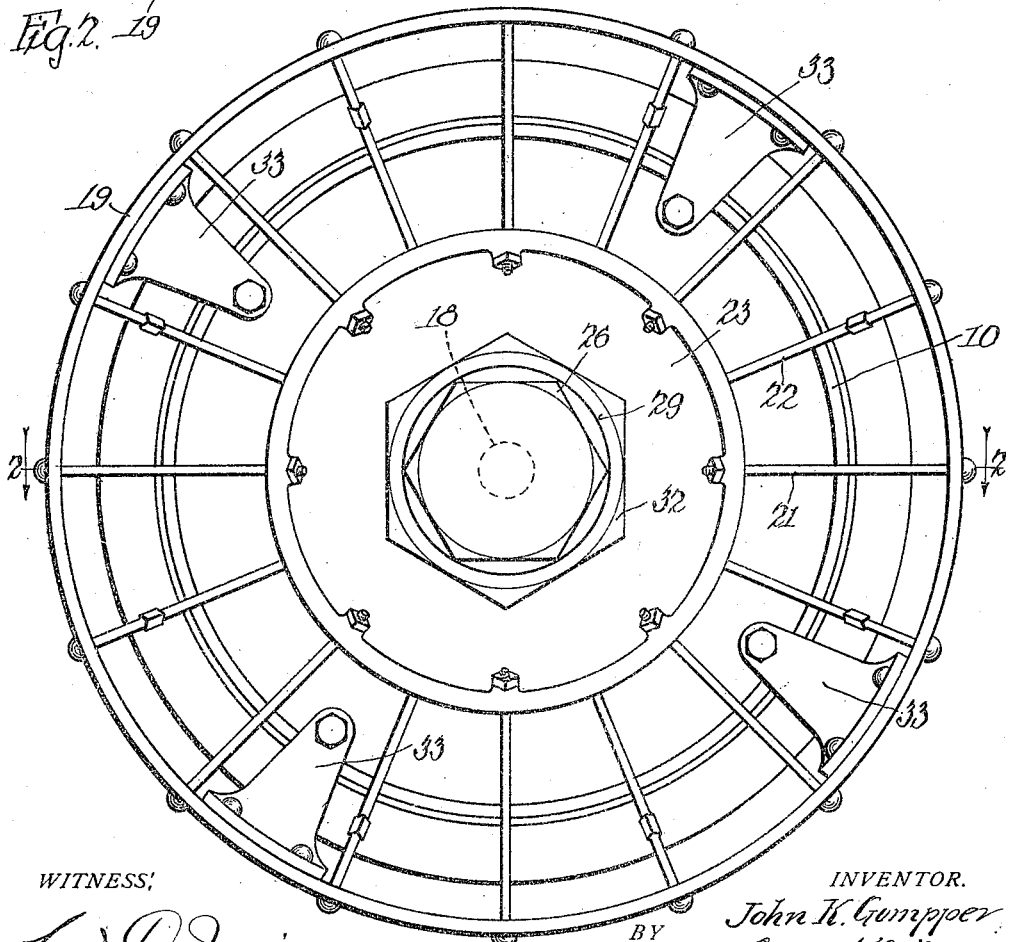
WITNESS:
Leo J. Dumais.
INVENTOR.
John K. Gumpper
BY R. W. Klotz
ATTORNEY

UNITED STATES PATENT OFFICE.

JOHN K. GUMPPER, OF CHICAGO, ILLINOIS, ASSIGNOR OF ONE-HALF TO WILLIAM H. WOOLUMS, OF DECATUR, ILLINOIS.

WHEEL ATTACHMENT.

1,306,004. Specification of Letters Patent. Patented June 10, 1919.

Application filed May 1, 1918. Serial No. 231,931.

*To all whom it may concern:*

Be it known that I, JOHN K. GUMPPER, a citizen of the United States, residing at Chicago, in the county of Cook and State of Illinois, have invented certain new and useful Improvements in Wheel Attachments, of which the following is a specification.

My invention relates to wheel attachments and has for its primary object, the provision of improved means for attaching one wheel to another; more particularly it applies to means whereby a tractor wheel may be attached to and readily removed from a motor vehicle driving wheel of smaller diameter than the tractor wheel.

Other objects and advantages of my invention will appear from the following description taken in conjunction with the accompanying drawings which form a part of this specification and illustrate the preferred embodiment of the invention.

In the drawings:

Figure 1 is a side elevation of a motor vehicle driving wheel showing a tractor wheel attached thereto by means embodying the present invention; and Fig. 2 is a section taken approximately on line 2—2 of Fig. 1.

Reference numeral 10 indicates generally a motor vehicle driving wheel having an exteriorly tapered hub 11 exposed on the outer side of the vehicle. Any suitable means of applying power to the driving wheel 10 may be employed, such for instance as inner and outer circular racks 12 and 13, high speed and low speed pinions 14 and 15 respectively meshing therewith, and driving shafts 16 and 17 for the respective driving pinions.

Reference numeral 18 indicates a fixed axle upon which the driving wheel 10 is rotatably mounted. At 19 is shown a tractor wheel adapted to be attached to the driving wheel 10, to receive power therefrom and to condition the motor vehicle for use upon soft ground for plowing, harrowing and other like purposes. The tractor wheel comprises the rim indicated on the drawings at 19 and spokes 21 and 22, by means of which the rim is fixedly secured to the hub 23 which is interiorly tapered as at 24 to slide over and to wedge upon the exteriorly tapered out-turned hub 11 of the driving wheel. The outer extremity of the hub 11 of the driving wheel is slightly reduced in diameter with relation to the remaining portion of the hub and is exteriorly threaded as at 25 to receive a hub nut 26 which is interiorly threaded for engagement with the threads 25 in order to force tractor wheel hub 23 into intimate wedged relation with the driving wheel hub 11.

The hub nut 26 is formed with an outturned circumferential flange 27 on its inner edge which contacts with the outer surface of tractor wheel hub 23 in order to retain the tractor wheel hub upon the hub of the driving wheel. An outwardly projecting annular boss 28 is formed on the hub 23 of the tractor wheel and is exteriorly threaded for engagement by an interiorly threaded collar 29 which carries an inturned flange 31 upon its outer edge. The collar 29 and its flange 31, when positioned upon the hub of the tractor wheel, form, in connection with said hub, an annular channel which fits about the outturned flange 27 of hub nut 26. This fit, however, is such that the hub nut can be turned with respect to the collar and tractor wheel hub. Circumferentially the collar 31 is formed into a hexagon by projections 32 so that a wrench may be applied to it to turn it as a nut is turned.

In the operation of my invention, the tractor wheel is placed about the driving wheel 10 and its hub 23 is forced upon the exterior of the driving wheel hub 11 by threading the hub nut 26 upon the threads 25. The wedging action which takes place in this operation serves to unite the driving wheel and tractor wheel rigidly together as one wheel. Following the application of the hub nut, the collar 29 is threaded upon the boss 28 of the tractor wheel hub and, when fully seated, leaves the annular channel above referred to; that is, the flange 31 of the collar overlies the outer surface of the flange 27 of the hub nut.

By means of this invention, the removal of the tractor wheel from the driving wheel is accomplished in a manner and by structure improved over many wheel pulling devices now on the market. By application of a wrench to the hub nut 26, the hub nut may be backed off of the threads 25, but, because of the overlapping of flanges 27 and 31, the hub nut in leaving the threads 25 of the driving wheel, breaks the wedged relation between the driving wheel hub and the tractor wheel hub and draws the tractor wheel hub off of the driving wheel hub. If desired, the bond between the driving and tractor wheels may be strengthened by means of struts 33 bolted to the felly of the driving wheel and riveted to the rim of the tractor wheel.

While I have illustrated and described the preferred embodiments of my invention, it will be obvious that one skilled in the art may make modifications thereof without departing from the spirit of the invention. I wish, therefore, not to be restricted to the precise embodiment shown, except in so far as the same is limited in the appended claim.

I claim:

The combination with a driving wheel, of an outwardly projecting hub therefor, a tractor wheel surrounding and attachable to said driving wheel and comprising a hub shaped to fit about the driving wheel hub, a hub nut threaded upon the outer extremity of the driving wheel hub and contacting with the outer surface of the tractor wheel hub, an out-turned circumferential flange upon said hub nut, a collar threaded upon the tractor wheel hub and surrounding the flange of the hub nut, an element projecting interiorly from the outer edge of the collar and overlapping the flange of the hub nut, said hub nut being rotatable within the collar and elements positioned within the rim of the tractor wheel for securing the rims of said wheels together.

In testimony whereof I affix my signature.

JOHN K. GUMPPER.

Copies of this patent may be obtained for five cents each, by addressing the "Commissioner of Patents, Washington, D. C."